United States Patent [19]

McArthur

[11] 4,289,608

[45] Sep. 15, 1981

[54] PROCESS FOR CATALYTICALLY CRACKING METALS-CONTAINING HYDROCARBON FEEDSTOCKS

[75] Inventor: Dennis P. McArthur, Yorba Linda, Calif.

[73] Assignee: Union Oil Company of California, Los Angeles, Calif.

[21] Appl. No.: 967,225

[22] Filed: Dec. 7, 1978

[51] Int. Cl.$^3$ ............................ C10G 9/16; B01J 8/24; C01B 1/09

[52] U.S. Cl. .................................... 208/121; 208/113; 208/120; 252/411 R

[58] Field of Search .......... 208/121, 120, 113, 48 AA; 252/411 R–415

[56] References Cited

U.S. PATENT DOCUMENTS

| | | | |
|---|---|---|---|
| 2,480,627 | 8/1949 | Bodkin et al. | 252/412 |
| 2,850,462 | 9/1958 | Plank | 252/412 X |
| 3,158,565 | 11/1964 | Sanford et al. | 208/120 |
| 3,324,044 | 6/1967 | Oberhofer | 252/413 |
| 3,501,264 | 3/1970 | Pilato et al. | 423/419 P |
| 3,711,422 | 1/1973 | Johnson et al. | 252/414 |
| 3,776,854 | 12/1973 | Dauteenberg et al. | 423/244 R |
| 3,944,482 | 3/1976 | Mitchell et al. | 208/120 |
| 3,977,963 | 8/1976 | Readal et al. | 208/120 |
| 4,036,740 | 7/1977 | Readal et al. | 208/120 |
| 4,115,249 | 9/1978 | Blanton et al. | 208/120 |

Primary Examiner—Delbert E. Gantz
Assistant Examiner—G. E. Schmitkons
Attorney, Agent, or Firm—Dean Sandford; Gregory F. Wirzbicki

[57] ABSTRACT

The life of cracking catalysts treating metals-containing hydrocarbon feedstocks is extended by depositing aluminum components on the surface of the catalyst particles.

22 Claims, No Drawings

PROCESS FOR CATALYTICALLY CRACKING METALS-CONTAINING HYDROCARBON FEEDSTOCKS

BACKGROUND OF THE INVENTION

This invention relates to a catalytic cracking process for treating hydrocarbon feedstocks of high metals content while minimizing or preventing losses in catalytic activity or selectivity due to metals deposition on the cracking catalyst. The invention further relates to a method for passivating metals deposited on cracking catalyst particles and for restoring a substantial portion of the activity and selectivity of cracking catalyst particles having metal contaminants on the surfaces thereof.

In the petroleum industry, a high boiling hydrocarbon feedstock is charged to a catalytic cracking unit, such as a fluidized catalytic cracking unit, so that, by contact with a moving bed of catalyst particles, the feedstock is converted to a more valuable hydrocarbon product of lower average molecular weight and lower average boiling point (e.g., gasoline). As is well-known, the feasibility of cracking a particular feedstock depends in large measure upon the concentration of nickel, vanadium, iron, copper, and other metals in the feedstock. These contaminant metals deposite upon the catalyst surfaces and cause a gradual decrease in the production of intended gasoline product and an increase in the production of undesired products such as coke and hydrogen. The higher the concentration of metals in the feedstock, the more rapid is the deposition of metals upon the catalyst surfaces. Consequently, the life of a catalyst for cracking purpoes varies inversely with the contaminant metals concentration in the feedstock, i.e., the larger the concentration of metals, the shorter the life of a catalyst for producing a minimum gasoline yield from a given hydrocarbon feedstock being catalytically cracked under a given set of conditions. Usually, the life of a cracking catalyst proves economically justified when the hydrocarbon feedstock contains less than 1 wppm of total metal contaminants (calculated as the sum of the vanadium, copper, iron, and nickel contaminants) and on occasion may prove justified when the feedstock contains less than about 4 wppm of total metal contaminants.

Several methods have been proposed to overcome the problems associated with metals deposition on cracking catalysts. One general method involves pretreating a hydrocarbon feedstock to reduce the metals concentration to an economically tolerable level for catalytic cracking feeds. One such pretreating method involves fractionating a hydrocarbon liquid to concentrate the metals therein into a heavy fraction and thereby produce a lighter, essentially metals-free fraction suitable as a cracking unit feedstock. In an alternative pretreatment method, the entire hydrocarbon liquid is subjected to catalytic demetallization, that is, the metals-containing hydrocarbon liquid is passed through a bed of catalytically active material that absorbs the metals and leaves a demetallized hydrocarbon product. Other methods for coping with the metals deposition problem involve removing the metal contaminants after they deposit on the catalyst or providing a catalyst, as described in U.S. Pat. No. 3,944,482, that remains highly active for hydrocarbon cracking reactions despite high concentrations of contaminant metals in the feedstock. Still other techniques are directed to introducing into the catalytic cracking unit one or more "passivating" agents that decrease the poisoning effects of the deposited metals. Methods illustrating this approach with manganese, bismuth, and antimony passivators are disclosed in U.S. Pat. Nos. 3,711,422 and 3,977,963.

At the present time, none of the above-described methods has found widespread use in the petroleum industry, largely because of the costs involved. Pretreating a feedstock for no other reason than to reduce the metals concentration requires an investment in capital equipment that seldom proves economically justified. Similarly, the added operational costs of metals-tolerant catalysts or compounds of bismuth and antimony often outweigh the advantages gained with such expensive materials. And although there are many disclosed processes for removing metals from cracking catalysts, such processes are very costly, requiring external reactivation facilities and expensive reactivation chemicals to restore, in the usual case, only a small portion of the original activity and selectivity of the catalyst.

Accordingly, it is an object of the invention to provide a process for maintaining the activity and selectivity of a cracking catalyst and thus prolong its useful life by utilizing inexpensive aluminum components to passify metal contaminants that deposit on the catalyst. It is a specific object of the invention to passivate metal contaminants with which cracking catalysts come in contact by blending organic aluminum compounds into a metals-containing feedstock entering the cracking unit. It is yet another object of the invention to modify the cyclic catalytic cracking process so that hydrocarbon feedstocks containing more than about 5 wppm of metal contaminants can be treated without unduly shortening the life of the cracking catalyst. It is still another object of the invention to reduce the rate at which catalyst particles containing metal contaminants are removed from cracking units, thereby also reducing the rate at which fresh catalyst particles must be added to the cracking unit. Other objects and advantages will become apparent to those skilled in the art from the following description of the invention.

SUMMARY OF THE INVENTION

According to this invention, aluminum components are deposited on cracking catalyst particles to extend the life of such particles when contacted under cracking conditions with a metals-containing hydrocarbon feedstock. Metal contaminants, and particularly contaminants of nickel, iron, vanadium, and copper, adversely affect the activity and selectivity of cracking catalysts and thus shorten their useful lives. But in the presence of deposited aluminum components and under conditions maintained in a typical catalytic cracking unit, such metal components are passivated, and the useful life of the catalyst is extended.

In an alternative embodiment of the invention, aluminum components are deposited on metals-contaminated cracking catalyst particles to restore sufficient activity or selectivity to the catalyst to allow its return to a catalytic cracking unit. The returned catalyst may be used to treat either a metals-containing or a metals-free hydrocarbon feedstock, and in general will prove highly suitable for treating hydrocarbon feedstocks containing less than about 50 wppm of metal contaminants.

All metal contaminants concentration of a hydrocarbon feedstock are reported as the sum of the concentrations of nickel, vanadium, iron, and copper (calculated as the free metals). It will be understood, however, that many other metals and many semimetals, such as chromium, selenium, manganese, zinc, molybdenum, arsenic, and lead, also shorten the life of cracking catalysts. Accordingly, it is within the scope of the invention to employ the methods described herein to extend the life of cracking catalysts contacted with feedstocks containing troublesome proportions of any of such metals or semimetals. (As with contaminants of iron, nickel, vanadium, and copper, contaminants of these metals and semimetals will largely comprise organometallic compounds in the hydrocarbon feedstock and subsequently will deposit on the catalyst as free elements or inorganic compounds, which, in accordance with this invention, are passivated by the presence of deposited aluminum components).

It will be understood by those skilled in the art that metal contaminants affect cracking catalysts in different ways. Most interfere with the catalyst selectivity by promoting undesired dehydrogenation reactions in the cracking reaction zone, resulting in increased coke, hydrogen, and light hydrocarbon production. Some may affect the catalyst activity itself, as by inhibiting the intended cracking reactions in the cracking reaction zone, thereby requiring more severe conditions to obtain a given yield. The invention provides a process for passivating metal contaminants so as to prevent or minimize the deletrious effects of metal contaminants on either catalyst activity, selectivity, or both, depending in a given situation upon how the metal contaminants affect a particular catalyst.

DETAILED DESCRIPTION OF THE INVENTION

This invention is directed to an improvement in the cyclic catalytic cracking process utilized in the petroleum industry to convert hydrocarbons in the absence of added hydrogen to more valuable products. The invention comprises a method for prolonging the life of a cracking catalyst for cracking hydrocarbons, and more particularly, for prolonging the life of cracking catalyst particles for producing a miniumum yield of intended hydrocarbon product from a metals-containing hydrocarbon feedstock under a specified set of conditions maintained in the cracking reaction zone.

The process of the invention is applicable to any catalytic cracking process wherein a metals-containing hydrocarbon feedstock is catalytically cracked at elevated temperatures in the presence of cracking catalyst particles to produce a product hydrocarbon of lower average boiling point and lower average molecular weight. The process is most useful for cracking processes treating hydrocarbon feedstocks containing more than 5 wppm of metal contaminants, and is particularly beneficial when the feedstock contains between about 5 and 50 wppm, preferably 5 to 25 wppm, of metal contaminants. Accordingly, if the hydrocarbon feedstock contains more than 50 wppm of metal contaminants, as may well be the case with vacuum and atmospheric residual fractions, such feedstocks are ordinarily diluted with a light gas oil or other hydrocarbon liquid containing less than about 1 wppm of metal contaminants to produce a feedstock blend containing less than about 50 wppm of metal contaminants. Alternatively, the feedstock containing more than 50 wppm of metal contaminants may be subjected to a deasphalting process to reduce the metals concentration to less than 50 wppm.

The invention will be found most particularly useful when the metals-containing hydrocarbon feedstock is being treated in a cyclic, fluidized catalytic cracking (FCC) unit. Typically in such units, catalyst particles are recycled through a catalytic cracking reaction zone, a stripping zone, and a regeneration zone. In the catalytic cracking zone, usually maintained in a cracking reactor known as a riser, conditions of elevated temperature are maintained such that the hydrocarbon feedstock in the presence of the catalyst particles is converted to a more valuable hydrocarbon product (e.g. gasoline) while a carbonaceous and hydrocarbonaceous-containing material (i.e. coke) deposits on the catalyst particles, thereby rendering such particles inactive for further catalytic cracking. To restore the catalyst particles to their original activity, they are first passed through a stripping zone, wherein a stripping gas such as steam or nitrogen is used to recover as much hydrocarbonaceous product as possible from the coke on the inactive catalyst particles. The remainder of the coke is removed by combustion in a regeneration zone in the presence of a free oxygen containing gas. The catalyst particles, now restored in activity and selectivity, are returned to the cracking zone and the cycle is repeated.

Normally, the FCC process as described cannot be usefully applied to hydrocarbon feedstocks containing more than about 5 wppm metal contaminants because the life of the cracking catalyst contacted with such feedstocks is shortened to an uneconomically short period of time. In this invention, however, the FCC or other catalytic cracking process is improved so that the catalyst particles retain a high degree of activity and selectivity despite the presence of contaminant metal components which would normally decrease catalyst activity and selectivity to unacceptable levels in a relatively short period of time. The method of this invention comprises depositing aluminum components as passivating agents on the cracking catalyst particles to promote the conversion of metal contaminants to innocuous forms. The aluminum components may be deposited before, after, or during the time the catalyst particles are contacted with a metals-containing hydrocarbon feedstock. As the catalyst containing the deposited aluminum components is cycled through the catalytic cracking, steam stripping, and regeneration zones of the cracking unit, the metal contaminants, whether previously deposited, subsequently deposited, or simultaneously deposited with the aluminum passivating agents, become less active for undesired dehydrogenation reactions and less inhibiting to intended cracking reactions. The chemical reactions by which the metal contaminants are passivated are believed to be catalyzed by the cracking catalyst particles, and although the invention is not limited thereby, it is theorized that the deposited aluminum components, if not initially introduced into the cracking unit as the oxide or hydroxide, are converted therein to such forms, which then passivate the metal contaminants by chemically reacting therewith. Postulated as typical of the chemical reactions occurring in the cracking unit are:

In the Catalytic Cracking Zone

$Ni + 2Al(OH)_3 \rightarrow NiAl_2O_4 + 2H_2O + H_2$ $$2V + 2Al(OH)_3 \rightarrow 2AlVO_3 + 3H_2$$

$$2V + 2Al(OH)_3 + 2H_2O \rightarrow 2AlVO_4 + 5H_2$$

In the Regenerator $$NiO + Al_2O_3 \rightarrow NiAl_2O_4$$

$$V_2O_5 + Al_2O_3 \rightarrow 2AlVO_4$$

$$2Ni + 4Al(OH)_3 + O_2 \rightarrow 2NiAl_2O_4 + 6H_2O$$

$$4V + 4Al(OH)_3 + 5O_2 \rightarrow 4AlVO_4 + 6H_2O$$

The metal contaminants are thus converted to inorganic compounds which are relatively inactive for dehydrogenation reactions in the catalytic cracking reaction zone, and the life of the catalyst particles is increased by decreasing the poisoning effects of the deposited metal contaminants.

In one embodiment of the invention, the activity and selectivity of a cracking catalyst is maintained or extended for cracking a hydrocarbon feedstock containing at least about 5 wppm of metal contaminants by contacting the catalyst with one or more aluminum compounds in a manner such that solid aluminum compounds are deposited upon the catalyst, preferably as a uniform dispersion. Any convenient method for depositing aluminum compounds on the surfaces of the catalyst particles may be employed. Suitable methods include dry mixing an aluminum compound with the catalyst particles, depositing aluminum compunds from a liquid carrier, or impregnating the catalyst with a dissolved aluminum compound. Impregnation, which is a preferred method due to the uniformity of the aluminum compounds dispersion produced, is accomplished by contacting the catalyst particles with a solution of one or more aluminum compounds. Typical impregnation solutions comprise an aqueous solution of aluminum nitrate or an organic solution of aluminum isopropoxide dissolved in isopropanol. If desired, the impregnated aluminum compounds may be converted to the oxide form by calcination, i.e., by contacting the impregnated catalyst for one hour with a free oxygen-containing gas such as air at a temperature at or above 1000° F.

The catalyst particles on which the aluminum components are dispersed may comprise fresh particles about to be introduced into a cracking unit, or alternatively, they may be catalyst particles already containing deposited metal contaminants from previous usage in a cracking unit. In either event, the catalyst particles, after being contacted with aluminum components, are introduced into a cracking unit processing a metals-containing hydrocarbon feedstock, and preferably into an FCC unit processing a hydrocarbon feedstock containing at least 5 wppm of metal contaminants.

In cyclical cracking processes such as the FCC process, wherein the catalyst particles are cycled successively through a cracking reaction zone maintained in a riser, a steam stripping zone maintained in a stripper, and then a combustion or regeneration zone maintained in a regenerator, the catalyst particles treated to contain dispersed aluminum compounds are preferably fed into the regeneration zone. In one embodiment of the invention, the catalyst particles are impregnated with an aluminum compound in an external facility and then introduced into the regenerator wherein, in the presence of coke undergoing combustion, the impregnated catalyst is calcined to produce an aluminum compound dispersion on the catalyst particles that consists essentially of aluminum oxide. In a still more preferred embodiment, wherein external facilities for impregnating the catalyst particles are obviated and the catalyst particles are impregnated and calcined within the cracking unit, a solution of an aluminum compound, and particularly an organic solution of an organic aluminum compound, is injected or sprayed into the regenerator. Within the regenerator, the catalyst particles are thus impregnated and then immediately calcined, producing a uniform dispersion of aluminum oxide on the catalyst particles that increases the useful life of the catalyst.

In accordance with the invention, the rate at which fresh catalyst particles are added to a cracking unit may be reduced by employing catalyst particles in the cracking unit containing deposited aluminum components. Catalyst particles are normally introduced into and withdrawn from the catalytic unit at rates that maintain the catalytic activity and selectivity of the entire catalyst charge within the unit at predetermined levels. Because the process of the invention extends the life of a catalyst for producing a minimum yield from a given metals-containing hydrocarbon feedstock under a given set of cracking conditions, the rate at which catalyst particles are withdrawn and the rate at which fresh catalyst particles are added as make-up without loss in yield will be substantially lower for a catalytic cracking unit employing catalyst particles containing deposited aluminum components than for a similar cracking unit processing the same feedstock under substantially the same conditions with catalyst particles not containing deposited aluminum compounds.

Thus, an advantage is realized in the invention in that cheap aluminum compounds are used to extend the life of a cracking catalyst and thereby reduce the rate at which fresh, expensive catalyst must be added to the FCC unit. A further advantage is realized in that, if small quantities of aluminum compounds are discharged with catalyst fines from the regenerator, no serious pollution problem is encountered, as is the case with prior art processes employing bismuth or antimony.

In the most highly preferred embodiment of the invention, an aluminum component in the form of a dissolved organic aluminum compound is carried into the cracking unit with the metals-containing hydrocarbon feedstock. This may conveniently be accomplished by dissolving an organic aluminum compound directly into the feedstock or indirectly, as by first dissolving the aluminum compound in an organic carrier and then blending the resulting organic solution into the hydrocarbon feedstock. The organic aluminum compound is preferably selected from the group consisting of aluminum s-butoxide (Al(OC$_4$H$_3$)$_3$), aluminum isopropoxide (or aluminum isopropylate, Al(OC$_3$H$_7$)$_3$), and aluminum acetylacetonate (Al(C$_5$H$_7$O$_2$)$_3$), with aluminum isopropoxide being most preferred due to its low cost. Liquid forms of these aluminum compounds may conveniently be obtained by dissolution in such organic carriers as xylene, toluene, methyl ethyl ketone, benzene, or the preferred carrier, isopropanol.

The rate at which the organic aluminum compound (or combination of organic aluminum compounds) is added to the hydrocarbon feedstock is such that the resulting blend contains aluminum compounds in a total concentration between about 0.1 and 200 wppm (calculated as aluminum), preferably between 1 and 10 wppm. Usually, the aluminum compounds are blended at a rate that provides at least 1 mole of aluminum for each mole of vanadium, copper, nickel, and iron entering the catalytic cracking unit. Preferably, however, the aluminum compounds are fed at a rate providing between about 1.5 and 5.0 moles of aluminum for each mole of such metal contaminants.

The organic aluminum compounds dissolved in the hydrocarbon feedstock are decomposed in the catalytic cracking reaction zone of the cracking unit, yielding a relatively uniform dispersion of inorganic aluminum compounds on the surface of the catalyst particles. Depositing aluminum compounds by this method disperses a relatively large amount of aluminum passivating agents while causing essentially no interference with the activity or selectivity of the catalyst particles. As will be shown hereinafter in Example 2, essentially no degradation of catalytic properties results when cracking catalyst particles are contacted with a hydrocarbon feedstock containing as much as 450 wppm of an aluminum compound.

The dispersed aluminum compounds on the catalyst particles in the cracking unit may be maintained at a desired percentage of catalyst weight by controlling the rate at which organic aluminum compounds are introduced into the feedstock in relation to the rate at which fresh catalyst particles are added to the unit and the rate at which catalyst particles containing deposited aluminum compounds are withdrawn from the unit. Usually, for the blending rates previously set forth for feeding organic aluminum compounds into the hydrocarbon feedstock, the dispersed aluminum compounds will be maintained in a typical cracking unit in a proportion between about 0.5 and 5.0% of catalyst weight (calculated as the percentage proportion of the weight of dispersed aluminum compounds (as aluminum) to the weight of the catalyst particle itself, exclusive of any material thereon).

The following examples are provided for illustrative purposes only, and they are not intended to limit the invention. Example 1 is hypothetical.

EXAMPLE 1

A feedstock blend of a gas oil and vacuum residuum contains 6.26 wppm of metals contaminants (3.82 wppm nickel, 1.58 wppm vanadium, 0.67 wppm iron, and 0.19 wppm copper). The feedstock blend is fed at a rate of 50,000 bpd into a typical fluid catalytic cracking unit recirculating 185 tons of rare earth Y zeolite catalyst particles through catalytic cracking, steam stripping, and catalyst regeneration zones. Aluminum isopropoxide ($Al(OC_3H_7)_3$) is blended with the feedstock at a rate sufficient to provide 2 moles of dissoived aluminum per mole of metal contaminants, i.e., at a rate of 690 lbs/day, providing a dissolved aluminum concentration in the feedstock blend of 6 wppm (as Al). Fresh catalyst particles are fed to the cracking unit to replace withdrawn metal contaminants-containing catalyst particles at a make-up rate of about 6000 lbs/day, which is substantially lower than the estimated make-up rate of 8000 lbs/day which would have been necessary had no aluminum compounds been added to the feedstock blend. The withdrawn, metal contaminants-containing catalyst particles contain about 1.5 catalyst weight percent aluminum compounds (as Al) dispersed thereon. The added costs to unit operations for the amount of aluminum isopropylate consumed per day is $415, assuming the cost of aluminum isopropylate is $.60 per pound.

EXAMPLE 2

Experiments were performed to determine if the presence of aluminum compounds in a hydrocarbon feedstock would interfere with the activity and selectivity of a cracking catalyst. In three separate experiments, a quantity of gas oil feedstock, differing in composition from that shown in Table I only as to the concentration of dissolved aluminum isopropylate therein (one feedstock contained no aluminum isopropylate, another 45 wppm, and the third 450 wppm (calculated as aluminum isopropylate)) was contacted with steam deactivated (i.e., steam pretreated) catalyst particles under identical cracking conditions.

More specifically, each of the three experiments was conducted as follows. Five grams of commercial, Davison Chemical CBZ-1 cracking catalyst particles were pretreated at 1380° F. for 17 hours at atmospheric pressure in a gaseous environment consisting of 100% steam. The five gram samples were then placed in a tubular reactor and maintained therein as a fixed bed. The temperature within the tubular reactor was held very nearly isothermally at 950° F. while the pressure was maintained at slightly above atmospheric. A sufficient amount of each of the three hydrocarbon feedstocks was introduced into the tubular reactor by means of a syringe to produce a catalyst to feedstock ratio (by weight) of 3.5. The catalytic reactions that occurred in the tubular reactor under the temperature and pressure conditions specified above were performed for a time period designed to simulate the equivalent of 14.6 weight hourly space velocity.

The product gases obtained from the three experiments were passed to a cold trap to condense out and collect the low-boiling liquid hydrocarbon product and the product gas. The liquid and gas products so obtained were analyzed to determine for each run the percentage volumetric conversion of feed to products and the product yields of hydrogen and $C_1$-$C_3$ light hydrocarbon gases, midbarrel fuels, coke, and gasoline, the latter being determined as the yield of liquid components that contain 5 or more carbon atoms and boil at temperatures of 400° F. or less.

Each of the three experiments was performed three times, and the analytical results obtained were averaged and tabulated in Table II. As shown, catalytic activity, in terms of the volumetric percentage conversion of the feedstock to overall products, and the catalyst selectivity, in terms of the yields of gasoline, coke, mid-barrel fuels, $C_1$-$C_3$ hydrocarbons and hydrogen were essentially the same, differing only within analytical error. Hence, the presence of aluminum compounds depositing upon the catalyst surfaces during the experiment resulted in no change in the activity or selectivity of the catalyst particles.

TABLE I

PROPERTIES AND CHARACTERISTICS OF GAS OIL FEEDSTOCK

| ASTM DISTILLATION D 1160, °F. | | | |
|---|---|---|---|
| 1BP/5 | 287/475 | Conradson Carbon, Wt. % | 0.10 |
| 10/20 | 526/574 | | |
| 30/40 | 637/685 | Nitrogen, Wt. % | 0.317 |
| 50/60 | 726/763 | | |
| 70/80 | 798/834 | Gravity, °API | 22.2 |
| 90/95 | 874/928 | | |
| Max | 966 | Sulfur, Wt. % | 1.14 |

TABLE I-continued
PROPERTIES AND CHARACTERISTICS OF GAS OIL FEEDSTOCK

ASTM
DISTILLATION
D 1160, °F.

| Recovery, Vol. % | 99.0 |
|---|---|

TABLE II

| | Feedstock With No Al(OC$_3$H$_7$)$_3$ | Feedstock With 45 wppm Al(OC$_3$H$_7$)$_3$ | Feedstock With 450 wppm Al(OC$_3$H$_7$)$_3$ |
|---|---|---|---|
| % Conversion (vol.) | 69.5 | 70.1 | 65.2 |
| % Gasoline (vol.) | 52.9 | 53.3 | 51.3 |
| % Mid Barrel (vol.) | 46.8 | 47.3 | 49.5 |
| % Coke (Wt. %) | 4.3 | 5.0 | 4.2 |
| C$_1$-C$_3$, SCF/bbl | 293 | 318 | 262 |
| H$_2$, SCF/bbl | 36 | 36 | 31 |

It will be apparent to those skilled in the art from the foregoing that numerous modifications and alternatives of the invention are contemplated. For example, it can be seen that, in one aspect, the invention comprises a method for restoring the activity or selectivity of cracking catalyst particles previously contaminated with metal components. The deposition of aluminum components on cracking catalyst particles containing metal contaminants restores sufficient of the activity and/or selectivity of the catalyst particles to allow a return of the catalyst particles to a cracking unit processing either a metals-containing or an essentially metals-free hydrocarbon feedstock. Within the cracking unit, the aluminum components decrease the dehydrogenation activity of the metal contaminants, or otherwise lessen their undesirable effects, thereby restoring the catalyst to acceptable activity and selectivity levels for cracking hydrocarbons. Accordingly, it is intended to embrace within the invention all such modifications as fall within the spirit and scope of the appended claims.

I claim:

1. In a catalytic cracking process wherein a metal contaminants-containing hydrocarbon feedstock is converted in a catalytic cracking reaction zone to more valuable hydrocarbons of lower average molecular weight and boiling point by contact with cracking catalysts particles at an elevated temperature, the improvement comprising adding one or more organic aluminum compounds into the hydrocarbon feedstock entering the catalytic cracking reaction zone, said feedstock containing between about 5 and 50 wppm of metals contaminants.

2. A process as defined in claim 1 wherein said one or more organic aluminum compounds are selected from the group consisting of aluminum isopropoxide, aluminum s-butoxide, and aluminum acetylacetonate.

3. A process as defined in claim 1 wherein said hydrocarbon feedstock comprises a vacuum of atmospheric residual fraction.

4. A process as defined in claim 1 wherein said one or more organic aluminum compounds are added into said hydrocarbon feedstock by dissolution at a rate such that the blend of said feedstock and organic aluminum compounds contains at least one mole of aluminum, calculated as the metal, for each mole of vanadium, copper, nickel, and iron contaminants, calculated as the free metals.

5. In a process for catalytically cracking hydrocarbons the improvement comprising (1) subjecting a hydrocarbon feedstock containing between about 5 and 50 wppm of metal contaminants to catalytic cracking conditions in the presence of cracking catalyst particles, whereby said hydrocarbon feedstock is converted into a product hydrocarbon of lower average molecular weight and boiling point, and (2) utilizing cracking catalyst particles in step (1) which contain one or more aluminum components deposited on the surfaces thereof during step (1).

6. A process as defined in claim 5 wherein said hydrocarbon feedstock contains metal contaminants selected from the group consisting of vanadium, iron, nickel, and copper contaminants.

7. A process as defined in claim 5 wherein said hydrocarbon feedstock comprises a residual fraction.

8. In a fluid catalytic cracking process for cracking hydrocarbons wherein catalyst particles are recirculated through (1) a catalytic cracking reaction zone wherein a metal contaminants-containing hydrocarbon feedstock is converted to a product hydrocarbon, (2) a stripping zone wherein carbonaceous material on the surface of the catalyst particles is stripped to yield more product hydrocarbon, and (3) a regeneration zone wherein remaining carbonaceous material on said catalyst surfaces is removed by combustion in the presence of a free oxygen-containing gas, the improvement wherein said feedstock comprises between 5 and 50 wppm metals contaminants and wherein aluminum components are deposited onto said catalyst particles while said particles are recirculated.

9. A process as defined in claim 8 wherein said hydrocarbon feedstock contains metal contaminants selected from the group consisting of vanadium, iron, nickel, and copper contaminants.

10. A process as defined in claim 9 wherein said aluminum components are deposited on said cracking catalyst particles by introducing a solution containing a dissolved aluminum component into the regeneration zone of said fluid catalytic cracking process.

11. In a process for catalytically cracking hydrocarbons in a catalytic cracking cycle comprising the alternate steps of (1) subjecting a hydrocarbon feedstock to catalytic cracking conditions in the presence of cracking catalyst particles, whereby said hydrocarbon feedstock is converted into a product hydrocarbon of lower average molecular weight and boiling point, and (2) removing carbonaceous material from the surface of said catalyst particles, the improvement comprising (a) utilizing in step (1) a hydrocarbon feedstock containing between about 5 and 50 wppm of metals contaminants, including at least some vanadium contaminants and (b) depositing aluminum components on said cracking catalyst particles while said catalyst particles are in said cracking cycle.

12. A process as defined in claim 11 wherein said cracking cycle is a fluid catalytic cracking cycle wherein catalyst particles are recirculated through (a) a catalytic cracking reaction zone wherein said hydrocarbon feedstock is subjected to said catalytic cracking conditions to yield said product hydrocarbon, (b) a stripping zone wherein carbonaceous material on the catalyst surfaces is stripped to yield more product hydrocarbons, and (c) a regeneration zone wherein remaining carbonaceous material on said catalyst surfaces is removed by combustion in the presence of a free oxygen-containing gas.

13. A process as defined in claim 5, 6, 7, 8, 9, 10, 11, or 12 wherein at least some of said aluminum components are deposited on said cracking catalyst particles by introducing into step (1) one or more organic aluminum compounds in dissolved form.

14. A process as defined in claim 13 wherein said organic aluminum compounds are selected from the group consisting of aluminum isopropoxide, aluminum s-butoxide, and aluminum acetylacetonate, and said organic aluminum compounds are dissolved in the hydrocarbon feedstock.

15. A process as defined in claim 1, 2, or 3 wherein said one or more organic compounds are added in dissolved form.

16. A process as defined in claim 15 wherein said hydrocarbon feedstock contains vanadium.

17. A process as defined in claim 15 wherein said hydrocarbon feedstock consists essentially of a residual fraction containing vanadium.

18. A process as defined in claim 1, 2, 4, 5, or 8 wherein said hydrocarbon feedstock comprises a residual fraction containing vanadium.

19. A process as defined in claim 5 or 8 wherein at least some of said aluminum components are deposited on said cracking catalyst by introducing into step (1) one or more organic aluminum compounds in dissolved form and wherein said hydrocarbon feedstock comprises a residual fraction containing vanadium.

20. A process as defined in claim 19 wherein said hydrocarbon feedstock contains metal contaminants selected from the group consisting of vanadium, copper, nickel, and iron, and said organic aluminum compounds are introduced into step (1) at a rate providing at least one mole of aluminum for each mole of vanadium, copper, nickel, and iron present in the feedstock also introduced into step (1).

21. In a fluid catalytic cracking process wherein catalyst particles are recirculated successively through a catalytic cracking reaction zone, a stream stripping zone, and a regeneration zone while a metal contaminants-containing hydrocarbon feedstock is introduced into said catalytic cracking reaction zone and therein converted to a product hydrocarbon of lower average molecular weight and lower average boiling point, the improvement wherein aluminum isopropoxide is dissolved into said hydrocarbon feedstock and said hydrocarbon feedstock comprises between about 5 and 50 wppm of metals contaminants.

22. A process as defined in claim 1, 2, 4, 5, 6, 8, 9, 10, 11, 12, or 21 wherein said hydrocarbon feedstock consists essentially of a residual fraction containing vanadium.

* * * * *